United States Patent [19]

Pflum

[11] Patent Number: 5,787,474
[45] Date of Patent: Jul. 28, 1998

[54] DEPENDENCY CHECKING STRUCTURE FOR A PAIR OF CACHES WHICH ARE ACCESSED FROM DIFFERENT PIPELINE STAGES OF AN INSTRUCTION PROCESSING PIPELINE

[75] Inventor: Marty L. Pflum, Austin, Tex.

[73] Assignee: Advanced Micro Devices, Inc., Sunnyvale, Calif.

[21] Appl. No.: 561,033

[22] Filed: Nov. 20, 1995

[51] Int. Cl.$^6$ .................................................. G06F 13/00
[52] U.S. Cl. ........................................................ 711/138
[58] Field of Search ............................. 395/465; 711/138

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 5,226,126 | 7/1993 | McFarland et al. | 395/394 |
| 5,226,130 | 7/1993 | Favor et al. | 395/585 |
| 5,471,598 | 11/1995 | Quattromani et al. | 395/465 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 1995, 16 pages.

Tom R. Halfhill, "AMD K6 Takes On Intel P6," BYTE, Jan. 1996, 4 pages.

*Primary Examiner*—David L. Robertson
*Attorney, Agent, or Firm*—Conley, Rose & Tayon; B. Noel Kivlin

[57] ABSTRACT

A pair of caches having a dependency checking structure for accesses between them is provided. One of the pair of caches is accessed from the decode stage of the instruction processing pipeline, while the other is accessed from the execute stage. The dependency checking structure monitors for memory dependencies between accesses to each of the pair of caches. Memory accesses may be performed earlier in the instruction processing pipeline than was previously achievable. Additionally, the dependency checking structure ensures that memory accesses receive the correct data by comparing accesses performed from each stage of the instruction processing pipeline to each other. In one embodiment, read and write dependency bits are stored by the cache which is accessed from the decode stage of the instruction processing pipeline. Decode stage accesses are recorded as a read or write by setting an associated dependency bit. When accesses are performed from the execute stage, the dependency bits are checked to determine if a dependency exists with respect to an access performed from the decode stage. Corrective actions are performed based on analysis of the dependency bits. Correct results are maintained for the cases in which dependencies exist by effectively forcing the accesses to occur in program order.

28 Claims, 5 Drawing Sheets

DEPENDENCY CHECKING STRUCTURE FOR A PAIR OF CACHES WHICH ARE ACCESSED FROM DIFFERENT PIPELINE STAGES OF AN INSTRUCTION PROCESSING PIPELINE

BACKGROUND OF THE INVENTION

1. Field of the Invention

This invention relates to the field of microprocessors and, more particularly, to dependency checking mechanisms for detecting memory dependencies when employing multiple caches within a microprocessor.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In an associative structure, the blocks of storage locations are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a row form the columns of the row. Each block of memory is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select which bytes are transferred to the outputs of the cache. Since only an index is required to select bytes from a direct-mapped cache, the direct-mapped cache is a "linear array" requiring only a single value to select a storage location within it.

A high bandwidth memory system is particularly important to a microprocessor implementing the x86 microprocessor architecture. The x86 architecture implements a relatively small register set including several registers which are not general purpose. Registers which are not general purpose may not be used to store an arbitrary value because the value they store has a specific interpretation for certain instructions. Consequently, many data values which a program is manipulating are stored within a stack. As will be appreciated by those of skill in the art, a stack is a data storage structure implementing a last-in, first-out storage mechanism. Data is "pushed" onto a stack (i.e. the data is stored into the stack data structure) and "popped" from the stack (i.e. the data is removed from the stack data structure). When the stack is popped, the data removed is the data that was most recently pushed. The ESP register of the x86 architecture stores the address of the "top" of a stack within main memory. The top of the stack is the storage location which is storing the data that would be provided if the stack is popped.

Since data on the stack is manipulated often, it would be advantageous to provide relatively quick access to data on the stack. In particular, accessing stack data as early as possible in the instruction processing pipeline may improve microprocessor performance by allowing instructions which access the stack to fetch their operands early. As used herein, the term "instruction processing pipeline" refers to a pipeline which performs instruction processing. Instruction processing includes fetching, decoding, executing, and writing the results of each instruction. An instruction processing pipeline is formed by a number of pipeline stages in which portions of instruction processing are performed. Typically, memory operands (both stack and non-stack) are accessed from the execute stage of the instruction processing pipeline.

Certain types of addressing employed by x86 instructions indicate that an access to stack data is occurring. However, other types of addressing employed by x86 instructions do not indicate a stack access. These types of addressing may still access data on the stack, since the stack is a block of memory in the x86 architecture and memory is accessible

3 via any type of addressing. In particular, the various addressing modes may indicate accesses to the same address. Coherency of the data stored at the address must be maintained such that a write to the address is reflected in data later read from that address. A structure which allows access to stack data prior to the execute stage of the instruction processing pipeline while still maintaining coherency between various addressing modes of instructions is desired.

SUMMARY OF THE INVENTION

The problems outlined above are in large part solved by a pair of caches having a dependency checking structure according to the present invention. In one embodiment, one of the pair of caches is a stack cache and the other of the pair is a data cache. One of the pair of caches is accessed from the decode stage of the instruction processing pipeline, while the other of the pair of caches is accessed from the execute stage of the instruction processing pipeline. The dependency checking structure monitors for memory dependencies between accesses to each of the pair of caches. Advantageously, memory accesses may be performed earlier in the instruction processing pipeline than was previously achievable. Performance may be increased for a superscalar microprocessor including the pair of caches. Additionally, the dependency checking structure ensures that memory accesses receive the correct data by comparing accesses performed from each stage of the instruction processing pipeline to each other.

In one embodiment, read and write dependency bits are stored by the cache which is accessed from the decode stage of the instruction processing pipeline. Decode stage accesses are recorded as a read or write by setting an associated dependency bit. When accesses are performed from the execute stage of the instruction processing pipeline, the dependency bits are checked to determine if a dependency exists with respect to an access performed from the decode stage. Corrective actions are performed based on analysis of the dependency bits, including stalling the execute stage access and flushing speculative results that were generated from incorrect data. A read performed from the execute stage which depends upon a write performed from the decode stage is stalled until the write completes. Conversely, a write performed from the execute stage upon which a read performed from the decode stage depends causes a flush of the speculative results generated by instructions subsequent to the write. Advantageously, correct results are maintained for the cases in which dependencies exist by effectively forcing the accesses to occur in program order. Accesses which have no dependencies are executed earlier than was previously achievable, which may enable increased performance.

Broadly speaking, the present invention contemplates a dependency checking structure comprising a cache including a first input bus, a second input bus, a dependency data storage, and a control unit. The first input bus is configured to convey a first plurality of memory accesses. The second input bus is configured to convey at least one memory access. Coupled to the first and second input buses is the dependency bits storage which includes a plurality of storage locations. Each of the plurality of storage locations is configured to store a plurality of dependency data indicative of a memory access to an associated cache line by an instruction. The control unit is configured to receive the plurality of dependency data stored in one of the plurality of storage locations selected by the memory access conveyed upon the second input bus. Furthermore, the control unit is configured to produce a signal on an output bus indicative of a dependency between the memory access and a prior memory access performed during a prior clock cycle.

4

The present invention further contemplates a method of detecting dependencies between a memory access to a first cache performed within a first pipeline stage and a second memory access performed within a second pipeline stage. The method comprises a recording step and a checking step. During the recording step, read and write memory accesses to the first cache are recorded. The checking step includes checking for a prior memory access to a storage location within the first cache when the second memory access is performed to the storage location.

The present invention still further contemplates a microprocessor comprising a stack cache and a data cache. The data cache is configured to store a plurality of data bytes. The stack cache includes a first input bus, a second input bus, a dependency data storage, and a stack cache control unit. The first input bus is configured to convey a first plurality of memory accesses; and the second input bus is configured to convey at least one memory access. Coupled to both the first input bus and the second input bus is the dependency data storage. The dependency data storage includes a plurality of storage locations configured to store a plurality of dependency data indicative of a memory access to an associated stack cache line by an instruction. The stack cache additionally includes a second plurality of storage locations coupled to the first and second input buses and configured to store data bytes. Finally, the stack cache control unit is configured to receive the plurality of dependency data stored in one of the plurality of storage locations. A particular one of the plurality of storage locations is selected by the memory access conveyed upon the second input bus. The stack cache control unit is further configured to produce a signal on an output bus indicative of a dependency between the memory access and a prior memory access performed during a prior clock cycle.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
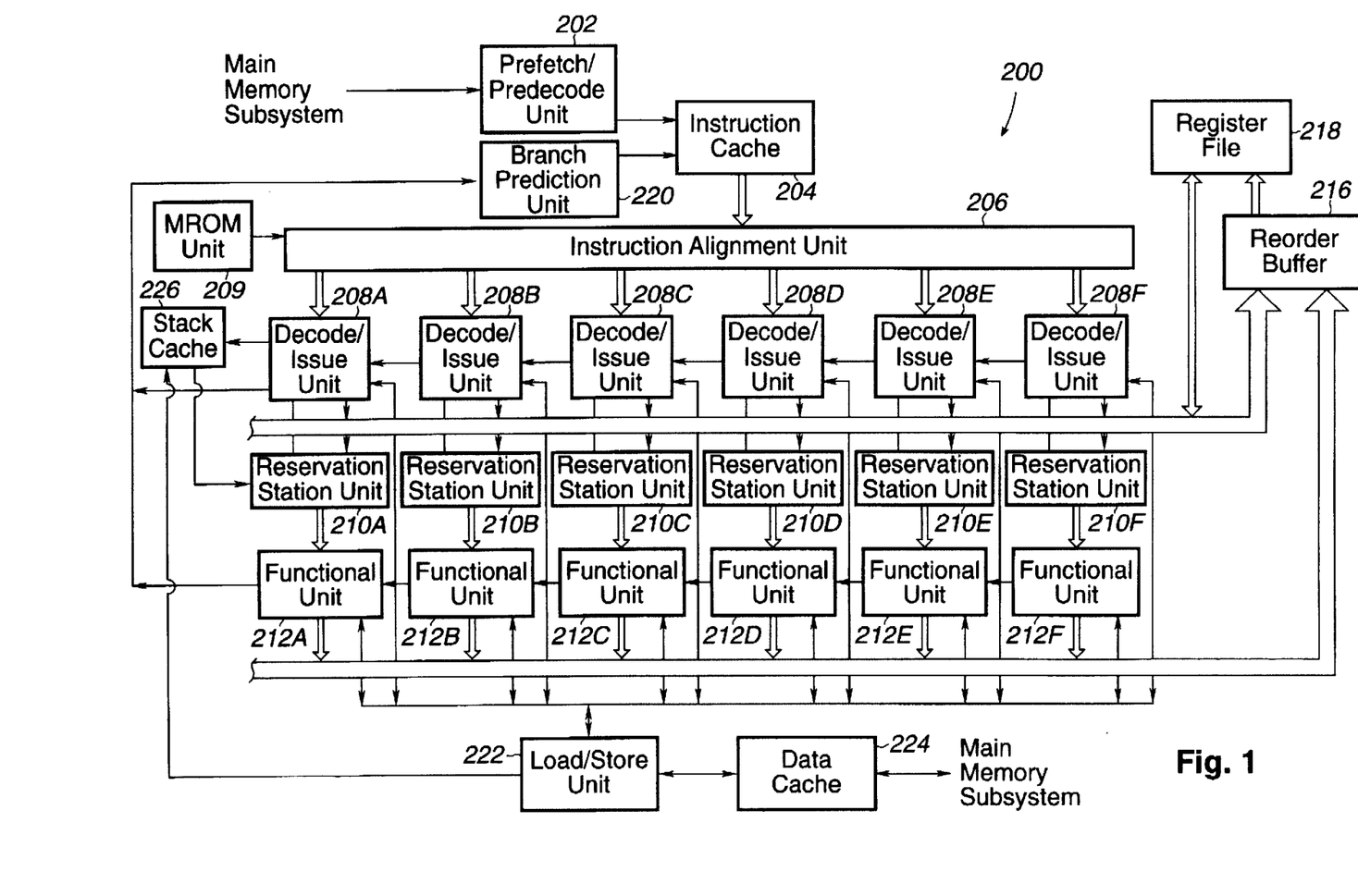
FIG. 1 is a block diagram of a superscalar microprocessor including a stack cache, reorder buffer, and load/store unit according to the present invention.

Turning now to FIG. 1, a block diagram of a superscalar microprocessor 200 including a stack cache 226, load/store unit 222, and reorder buffer 216 in accordance with the present invention is shown. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208F (referred to collectively as decode units 208). Each decode unit 208A–208F is coupled to respective reservation station units 210A–210F (referred to collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is shown coupled to load/store unit 222, and an MROM unit 209 is shown coupled to instruction alignment unit 206. Finally, stack cache 226 is coupled to load/store unit 222, decode units 208, data cache 224, and reorder buffer 216 (not shown).

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set.

If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3-8 | 0 | X | 0 | Mod R/M or SIB byte |
| 3-8 | 0 | X | 1 | Displacement or immediate data; the second functional bit set in bytes 3-8 indicates immediate data |
| 1-8 | X | 0 | X | Not last byte of instruction |
| 1-8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208F. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the dependency checking structure formed by stack cache 226, data cache 224, load/store unit 222, and reorder buffer 216, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A-208F routes displacement and immediate data to a corresponding reservation station unit 210A-210F. Output signals from the decode units 208 include bit-encoded execution instructions for the functional units 212 as well as operand address information, immediate data and/or displacement data.

Decode units 208 additionally detect "stack-relative" memory accesses. As used herein, a "stack-relative" memory access is a memory access utilizing an addressing mode that is indicative of a stack access (as defined in the x86 architecture, for example). In one embodiment, a stack-relative memory access is a memory access in which the address is formed using the value stored in the ESP or EBP registers of the x86 architecture along with a possible offset specified by the instruction. Decode units 208 are capable of generating a current ESP or EBP value even though some instructions prior to the instructions being decoded may not have executed yet. Exemplary hardware for this function is described in the commonly assigned, co-pending patent application entitled: "A Lookahead Register Value Generator and a Superscalar Microprocessor Employing the Same", Ser. No. 08/480,092 filed Jun. 7, 1995 by Pflum. The disclosure of this patent application is incorporated herein by reference in its entirety. If a particular decode unit 208A-208F detects a stack-relative memory access, then that decode unit generates the address associated with that stack-relative memory access and conveys the address to stack cache 226. If the data exists within stack cache 226 and the memory access is a read, the data is transferred to the respective reservation station 210A-210F. Advantageously, stack-relative memory accesses occur in the decode stage of the instruction processing pipeline. A memory access may be a read access, in which bytes are transferred from memory to a destination specified by the instruction, or a write access, in which bytes are transferred from a source specified by the instruction to memory.

A "non-stack-relative" memory access is a memory access utilizing an addressing mode which is not indicative of a stack access. However, non-stack-relative memory accesses may access the stack. In the x86 architecture, for example, indirect addressing utilizing a register other than the ESP or EBP registers is a non-stack-relative memory access. As will be appreciated by those skilled in the art, indirect addressing is an addressing mode wherein the address is formed from the value stored in a register. In some cases, the address is formed by adding the value in the register to an offset provided with the instruction. The offset may be directly provided with the instruction, or indirectly through a register. The x86 architecture includes several registers, for example an EAX register, which may be used to provide the address of an operand via indirect addressing. If the EAX register specifies an address within the stack (as located by the ESP register), then a dependency may exist between the memory access specified by the EAX register and memory accesses generated from the ESP or EBP registers. Microprocessor 200 additionally classifies memory accesses having an address formed from the ESP or EBP registers and an indirect value stored in another register as non-stack-relative memory accesses. In one embodiment, decode units 208 are not configured to generate an address for a non-stack-relative memory access. Instead, these addresses are generated by functional units 212 during a subsequent clock cycle.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible. If a branch prediction is incorrect, the results of speculatively-executed instructions along the mispredicted path can be invalidated in the buffer before they are written to register file 218.

The bit-encoded execution instructions and immediate data provided at the outputs of decode units 208A-208F are routed directly to respective reservation station units 210A-210F. In one embodiment, each reservation station unit 210A-210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A-208F is associated with a dedicated reservation station unit 210A-210F, and that each reservation station unit 210A-210F is similarly associated with a dedicated functional unit 212A-212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

It is noted that in one embodiment, the bit-encoded execution instructions comprise several one-hot encodings. A one-hot encoding includes values in which at most one bit of the value is set. For example, a one-hot encoding configured to assume eight different values is eight bits wide. Each one of the eight bits being set while the other seven bits are clear is indicative of a particular one of the eight values. Since no bits of a one-hot bit-encoded instruction are combined to determine the indicated instruction, the one-hot encoding may reduce the number of cascaded levels of logic used to perform the instruction within a functional unit 212. It is further noted that in one embodiment, the bit-encoded execution instructions are physically stored within the functional units 212.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222 or stack cache 226.

Reorder buffer 216 is additionally responsible for completing stack-relative write accesses to stack cache 226. When an instruction which writes a stack memory location within stack cache 226 retires, reorder buffer 216 conveys the data bytes to be written to stack cache 226. Stack cache 226 stores the data bytes in the appropriate storage location. During a later clock cycle, stack cache 226 may discard a cache line containing data bytes written in this fashion. At the time the data bytes are removed from stack cache 226, they are transferred to data cache 224.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al., now U.S. Pat. No. 5,651,125. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212F and data cache 224. In one embodiment, load/store unit 222 is configured with a load/store buffer with eight storage locations for data and address information for pending loads or stores. Decode units 208 arbitrate for access to load/store unit 222 in order to place non-stack-relative memory accesses as well as stack-relative memory accesses that may not be completed by stack cache 226 into the load/store buffer. When the buffer is full, a decode unit must wait until the load/store unit 222 has room for the pending load or store request information. Load/store unit 222 also performs dependency checking for load memory accesses against pending store memory accesses to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Stack cache 226 is a high speed cache memory provided to temporarily store stack data. In one embodiment, stack cache 226 is configured to store eight lines of 32 bytes each. It is understood that stack cache 226 may be implemented in a direct-mapped, set-associative, or fully associative configuration. Data stored within stack cache 226 may also be stored within data cache 224. When a stack-relative memory access is detected by a decode unit 208 and the associated data is not stored within stack cache 226, then the associated data is transferred to stack cache 226 from data cache 224. Additionally, if the line being replaced within stack cache 226 contains data bytes that are the result of a write access, the replaced line is conveyed to data cache 224. It is noted that such a transfer may be accomplished similar to the disclosure of: "A Method for Transferring Data Between a Pair of Caches Configured to be Accessed from Different Stages of an Instruction Processing Pipeline" Ser. No. 08/561073 filed concurrently herewith by Tran, et al. The disclosure of this patent application is incorporated herein by reference in its entirety.

Figure 2:
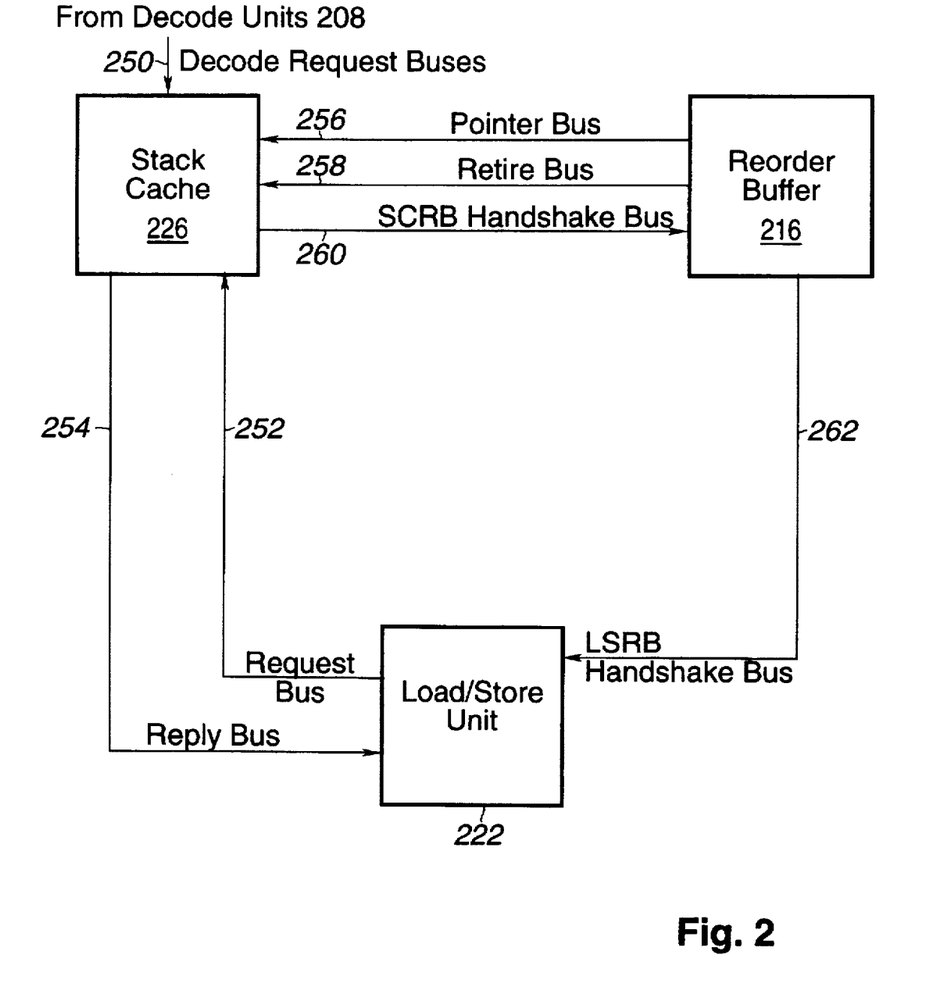
FIG. 2 is a block diagram of the stack cache, reorder buffer, and load/store unit shown in FIG. 1, including a more detailed view of interconnections between the blocks according to one embodiment of the present invention.

Turning now to FIG. 2, a block diagram of stack cache 226, reorder buffer 216, and load/store unit 222 is shown to highlight the interconnections between these units according to one embodiment of the present invention. The interconnections include: a decode request bus 250 coupled between decode units 208 (shown in FIG. 1) and stack cache 226; a request bus 252 coupled between load/store unit 222 and stack cache 226; a reply bus 254 coupled between stack cache 226 and load/store unit 222; a pointer bus 256 and a retire bus 258 coupled between reorder buffer 216 and stack cache 226; an SCRB handshake bus 260 coupled between stack cache 226 and reorder buffer 216; and a LSRB handshake bus 262 coupled between reorder buffer 216 and load/store unit 222.

Generally speaking, decode units 208 detect stack-relative memory accesses with respect to instructions being decoded during a clock cycle and convey read or write memory accesses to stack cache 226 upon decode request buses 250. If data associated with a read memory access is stored within stack cache 226, then stack cache 226 conveys the data to the respective reservation station 210 associated with the decode unit 208 making the request. Load/store unit 222 performs non-stack-relative memory accesses (and those stack-relative memory accesses for data not stored in stack cache 226) to data cache 224 and to stack cache 226. Because non-stack-relative memory accesses may access memory locations within the stack, dependency checking is performed between stack-relative memory accesses (which occur from the decode stage of the instruction processing pipeline) and non-stack-relative memory accesses (which occur from the execution stage of the instruction processing pipeline). Because the accesses occur from different pipeline stages, instructions which are relatively close to each other in a program may perform their memory accesses at significantly different times. Additionally, the speculative nature of microprocessor 200 dictates that read memory accesses may occur in an arbitrary order. A dependency checking structure for stack cache 226 and data cache 224 within a microprocessor 200 is employed to detect dependencies between the accesses. A memory access (read or write) is "dependent" upon a prior memory access if the memory access reads or writes data bytes that the prior memory access writes. If both of the memory accesses are read memory accesses, then there is no dependency since the memory accesses do not change the accessed data bytes.

The dependency checking structure described herein stores dependency bits associated with each stack cache line. The dependency bits are indicative of read and write accesses which have been performed to stack cache 226, and which reorder buffer line the associated instruction is stored within. This information is sufficient to indicate which memory accesses are dependent on prior memory accesses and what the program order of the accesses are. As used herein, the term "program order" refers to the order in which instructions of a program would be executed if each instruction were fetched, decoded, executed, and results written before the next instruction were fetched. If a stack-relative read access is detected to be dependent upon a non-stack-relative write access, then the instruction processing pipeline is flushed from the instruction subsequent to the non-stack-relative write access to the decode stage. As used herein, the term "flush" refers to discarding an instruction along with any results it may have computed. If a non-stack-relative read access is dependent on a stack-relative write access, then the non-stack-relative read access is stalled until the stack-relative write access has written its data. Flushing and stalling are exemplary corrective actions which may be taken upon discovery of stack-relative to non-stack-relative dependencies.

Dependency checking between stack-relative and non-stack-relative memory accesses may be better understood with respect to Table 2 below. Table 2 depicts each of the possible memory dependency checking scenarios. A DC_read is a read access performed at the execution stage of the instruction processing pipeline. A DC_write is a write access performed at the execution stage of the instruction processing pipeline. An SC_read and SC_write are a read and a write access (respectively) performed at the decode stage of the instruction processing pipeline. DC_read and DC_write are performed to both data cache 224 and stack cache 226, while SC_read and SC_write are performed to stack cache 226. An operation has a potential dependency if it is performed after another operation in program order. Table 2 shows the operation occurring first in program order as its rows, and the operation occurring second in program order as its columns. Each entry in the table indicates the unit responsible for detecting dependencies when the column operation is performed after the row operation (in program order).

TABLE 2

| Dependency Checking Scenarios | | | | |
|---|---|---|---|---|
| | SC_read | SC_write | DC_read | DC_write |
| After: SC_read | none | ROB | none | SC |
| SC_write | ROB | ROB | SC | ROB & SC |
| DC_read | none | SC | none | LS |
| DC_write | SC | ROB & SC | LS | ROB | none: read after read is not a dependency since the data is not changed.
ROB: The reorder buffer causess writes to be performed in program order. A DC_write which is after an SC_write within the same reorder buffer line is marked in reorder buffer 216 as an SC_write when the write is performed by load/store unit 222 (as explained in more detail below). Additionally, SC_read after SC_write is handled via renaming and forwarding between functional units (based on linear address) similar to register renaming and forwarding. In another embodiment, SC_read after S_C write dependencies are handled similar to load/store unit 222 (described below). Since writes are not performed speculatively, write after read is performed in order.
LS: Load/store unit 222 correctly orders DC_read and DC_write accesses. DC_read and DC_write accesses are stored into the load/store buffer in program order. When a read is performed out of order, its address is compared with the write addresses of instructions prior to the read. If a write address is not available, then a dependency is assumed until the address is available. When a dependency is detected, the read is delayed until the operation upon which it depends receives data. The data is then forwarded as the read data.
SC: Stack cache 226 performs the dependency checking as described below with respect to FIG. 3.

In one embodiment, pointer bus 256 conveys a head pointer and a tail pointer indicative of the storage locations within reorder buffer 216 containing outstanding instructions. The tail pointer is indicative of the storage location containing the oldest outstanding instruction (i.e. the least recently dispatched instruction), and the head pointer is indicative of the last allocated storage location (i.e. the most recently dispatched instruction). The retire bus is employed by reorder buffer 216 to convey stack-relative write accesses to stack cache 226 for storing of the data associated with these write accesses when the instruction is retired. As will be explained in greater detail below, a stack-relative write accesses stack cache 226 when it occupies the decode stage of the instruction processing pipeline, but does not perform the writing of data bytes until the instruction is retired by reorder buffer 216. Additionally, SCRB handshake bus 260 is utilized for conveying signals indicative of a write access initiated by load/store unit 222 to a stack cache location that is written by a stack-relative write access which is within the same reorder buffer line as the write access from load/store unit 222. Reorder buffer 216 changes the status of the write access from load/store unit 222 to be a stack-relative write access, so that any stack-relative write accesses to the same location which are prior to the write access will not be performed. More detail will be provided below with respect to FIG. 3. SCRB handshake bus 260 also conveys a flush request from stack cache control unit 302 due to a stack-relative read access that was performed in a previous clock cycle and is determined to be dependent upon a non-stack-relative write access performed during the current clock cycle. In one embodiment, the flush request includes a value indicative of the reorder buffer storage location which stores the non-stack-relative write access. Each reorder buffer storage location following the write access is flushed by reorder buffer 216.

LSRB handshake bus 262 conveys signals indicative of a non-stack-relative read access retry for which a stack-relative write dependency was detected. Once the stack-relative write access upon which the read access is dependent is retired, the non-stack-relative read access may be retried by load/store unit 222. LSRB handshake bus 262 informs load/store unit 222 of when to perform this retry. In one embodiment, LSRB handshake bus 262 conveys a value indicative of the reorder buffer storage location storing the oldest load instruction. Load/store unit 222 is configured to retry a read access on behalf of a stalled load when the load's reorder buffer storage location is indicated on LSRB handshake bus 262. An indication that the read access is a retry is conveyed to stack cache 226. Stack cache 226 ignores the dependency checking bits of the reorder buffer line containing the read access when it receives the retry indication. Load/store unit 222 employs request bus 252 for conveying read and write accesses to stack cache 226. Replies associated with these read and write accesses (including stack cache hit information and data) are returned from stack cache 226 on reply bus 254.

Figure 3:
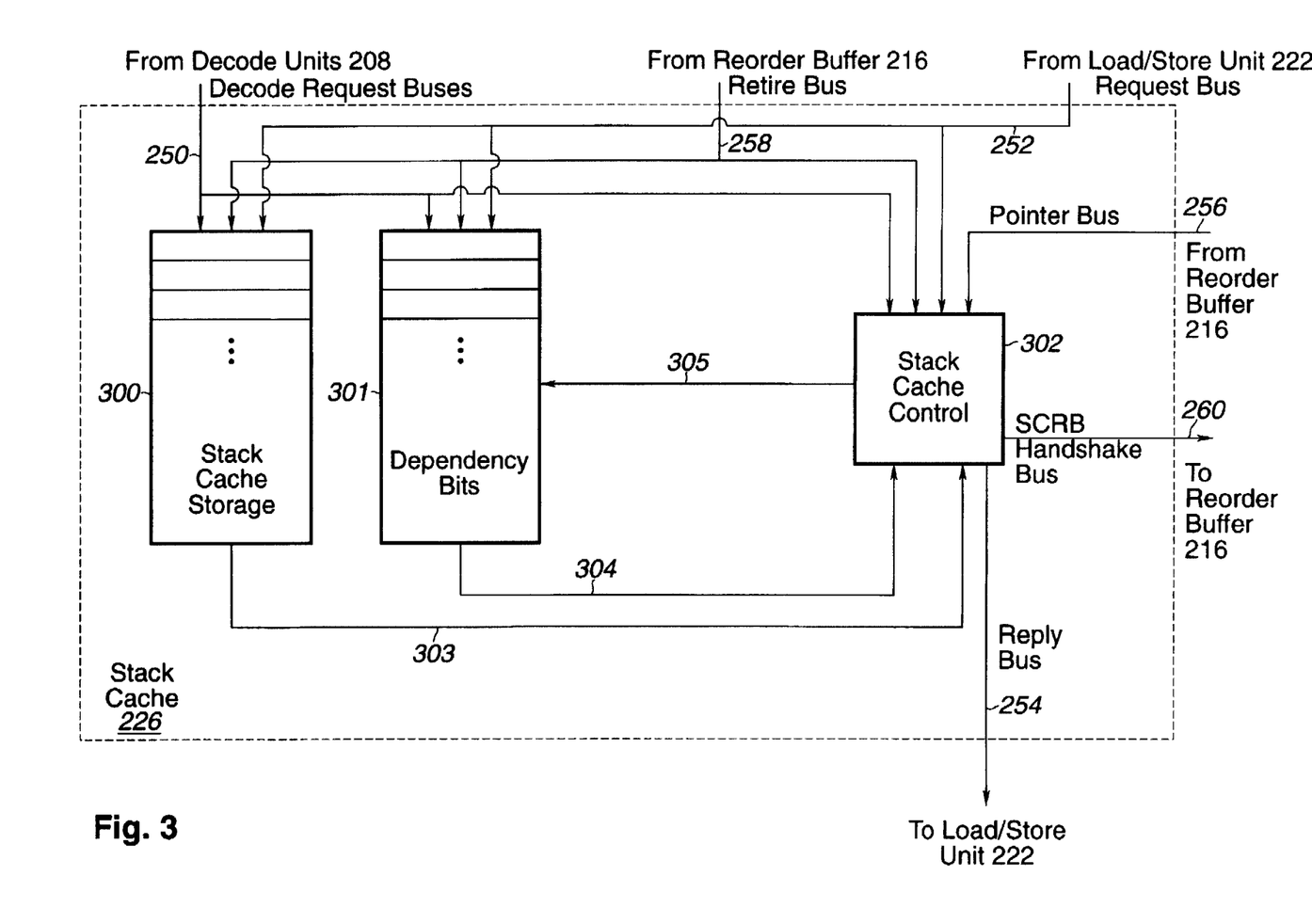
FIG. 3 is a block diagram of the stack cache shown in FIGS. 1 and 2, showing various components according to the one embodiment of the present invention including a dependency bits storage.

Turning now to FIG. 3, a block diagram of one embodiment of stack cache 226 is shown. For simplicity, only portions of stack cache 226 related to the present invention are shown. Stack cache 226 includes a stack cache storage 300 and a dependency bits storage 301. Stack cache storage 300 and dependency bits storage 301 are configured similarly with respect to associativity and numbers of rows, and may be associative or direct-mapped. Stack cache storage 300 stores data bytes as well as tag addresses for stack cache 226, and may be implemented as a single array, multiple arrays, or multiple registers. Dependency bits storage 301 stores dependency bits for each line of stack cache 226, and may be implemented as a single array or multiple registers. As used herein with respect to caches, a "line" or "cache line" is a set of contiguous data bytes stored together as a single cacheable unit. In one embodiment, a stack cache line is 32 contiguous bytes.

The dependency bits include read bits and write bits. In one embodiment, a read and a write bit is stored for each doubleword of a stack cache line and each line of reorder buffer 216. A line of reorder buffer 216 contains one or more instructions which were decoded by decode units 208 during a single clock cycle. If a particular read bit is set, then the particular doubleword has been accessed by a stack-relative read access associated with an instruction within the particular reorder buffer line. Similarly, if a particular write bit is set, then the particular doubleword has been accessed by a stack-relative write access associated with an instruction within the particular reorder buffer line. A doubleword is a 32 bit quantity stored at an address having the least significant two bits set to zero.

In another embodiment, a read bit and write bit is stored for each line of stack cache 226 and each line of reorder buffer 216. The dependency checking in this embodiment is performed to a lesser granularity then the previously mentioned embodiment, and so false dependencies may be detected more often. A false dependency is a dependency detected by stack cache 226 which does not truly exist. For example, an instruction may perform a non-stack-relative write access to a doubleword, and another instruction may perform a stack-relative read access to another doubleword within the same stack cache line. This embodiment would detect such a pair of accesses as having a dependency, even though a dependency does not truly exist since the addresses being accessed do not overlap. Additionally, memory accesses which are associated with instructions within the same reorder buffer line may be falsely detected as dependent according to both embodiments. However, since dependencies between stack-relative and non-stack-relative memory accesses are relatively infrequent, such a lesser granularity may not significantly impact performance. In either case, the accesses detected as dependent are performed in program order and so the program executes correctly.

Stack cache 226 includes a stack cache control unit 302 responsible for performing dependency checking utilizing the dependency bits, as well as for setting the dependency bits according to stack-relative memory accesses conveyed on decode request buses 250. Stack cache control unit 302 produces signals upon SCRB handshake bus 260 and reply bus 254 indicative of the detected dependencies. Other functions related to stack cache management are performed by stack cache control unit 302 as well, such as clearing the dependency bits associated with a reorder buffer line when the line is retired and controlling the replacement strategy of stack cache 226 when a stack cache miss is detected and data bytes are conveyed to stack cache 226 for refill.

Stack cache control unit 302 receives tag information with respect to the indexed row(s) of stack cache storage 300 upon a tag bus 303, as well as the associated dependency bits on a dependency bits bus 304. Additionally, stack cache control unit 302 is coupled to pointer bus 256 from reorder buffer 216. Stack cache storage 300, dependency bits storage 301, and stack cache control unit 302 each receive decode request buses 250, retire bus 258, and request bus 252.

Stack-relative memory accesses are conveyed on decode request buses 250 to stack cache 226. If a stack-relative read access is performed and hits stack cache 226, then stack cache control unit 302 causes a read bit to be set within the dependency bits associated with the hitting stack cache line. The set read bit is associated with the reorder buffer line which stores the associated instruction. Similarly, if a stack-relative write access is performed, then stack cache control unit 302 causes a write bit to be set within the dependency bits associated with the hitting stack cache line. Read data is conveyed to the reservation station 210 associated with the requesting decode unit 208 during the clock cycle the read access is performed. However, stack-relative write accesses do not perform the write of the data during the clock cycle. Write data may not be available, and writes are not performed speculatively by microprocessor 200. Instead, stack-relative write accesses perform the writing of the data when the associated instruction is retired by reorder buffer 216. Retire bus 258 is used for this purpose. In order to update the dependency bits, stack cache control unit 302 is coupled to a write port upon dependency bits storage 301 via an update bus 305.

Load/store unit 222 performs non-stack-relative memory accesses upon request bus 252. The information conveyed with a memory access upon request bus 252 includes the read/write nature of the memory access as well as a value indicative of the reorder buffer storage location occupied by the associated instruction. Additionally, load/store unit 222 accesses data cache 224 in parallel with its access to stack cache 226. If a non-stack-relative read access hits in stack cache 226, then the data stored in stack cache 226 is captured by load/store unit 222 as the load data. Otherwise, data from data cache 224 is used. If a non-stack-relative write access hits in stack cache 226, then stack cache 226 is updated with the write data. Data cache 224 is updated as well.

Stack cache control unit 302 performs dependency checking upon the non-stack-relative memory accesses as they are performed to stack cache 226. If a non-stack-relative read access hits stack cache 226, then the associated write dependency bits are processed. If a stack-relative write access to the same location as the non-stack-relative read access occurs in program order prior to the non-stack-relative read access (as indicated by the write dependency bits), then a dependency may exist between the stack-relative write access and the non-stack-relative read access. A signal upon reply bus 254 is activated indicating that a dependency may exist and the associated instruction should be stalled in load/store unit 222. Stack cache control unit 302 uses the tail pointer information from pointer bus 256 to ensure that only dependency bits associated with reorder buffer lines which are currently storing instructions are processed. Additionally, the reorder buffer lines subsequent to the line containing the instruction associated with the read access are not processed. The value indicative of the reorder buffer storage location storing the read access instruction identifies which dependency bits to ignore. When load/store unit 222 receives the signal indicative of dependency, the read access is marked as dependent upon a stack-relative write access. The read access is not attempted again until load/store unit 222 is informed by reorder buffer 216 that the read access may be retried.

If a non-stack-relative write access is performed by load/store unit 222 and the access hits stack cache 226, then stack cache control unit 302 processes the associated read dependency bits. If a stack-relative read access subsequent to the write access has already accessed the location being written by the write access, then a dependency may exist. The value indicating the reorder buffer storage location storing the write access identifies which reorder buffer lines contain instructions subsequent to the write access. Read dependency bits associated with reorder buffer lines between the write access and the head pointer (inclusive) are processed. If a stack-relative read access is indicated by the read dependency bits being examined, then stack cache control unit 302 conveys a flush request upon SCRB handshake bus 260 to reorder buffer 216. The flush request includes the value indicating the reorder buffer storage location associated with the write access, and reorder buffer 216 flushes all reorder buffer storage locations subsequent to the storage location identified by the value. Instructions subsequent to the write access are then fetched and executed again. In this manner, instructions which may have executed with incorrect data are discarded and re-executed.

Another dependency check performed by stack cache control unit 302 involves stack-relative and non-stack-relative write accesses associated with instructions stored within the same reorder buffer line. When a non-stack-relative write access is performed, stack cache control unit 302 examines the write dependency bit associated with the reorder buffer line containing the non-stack-relative write access instruction. If the write dependency bit is set, stack cache control unit 302 conveys a signal upon SCRB handshake bus 260. As mentioned above, this signal is indicative of a non-stack-relative write access being performed by load/store unit 222 which should be recorded by reorder buffer 216 as a stack-relative write access.

Reorder buffer 216 is configured to compare stack-relative write accesses within a line for multiple stack-relative write accesses to the same address. The last stack-relative write access to an address is performed upon retire bus 258 when the reorder buffer line is retired. If the non-stack-relative write access were not recorded as stack-relative in reorder buffer 216, then incorrect data could be stored within stack cache 226 after the reorder buffer line is retired. Incorrect data would be stored for the case where a non-stack-relative write access is subsequent to a stack-relative write access to the same address, since the stack-relative write access performs its data update in a clock cycle subsequent to the non-stack-relative write access. In this manner, if reorder buffer 216 has a stack-relative write access in the same reorder buffer line as the non-stack-relative write access and the accesses are to the same address, then reorder buffer 216 will perform the last write access to the address (regardless of whether it is stack-relative or non-stack-relative). It is noted that reorder buffer 216 is configured to perform this check for stack-relative write accesses, so by changing the non-stack-relative write access to a stack-relative write access the same hardware may be used to correctly store the data between stack-relative and non-stack-relative write accesses. In the case where the update is actually a non-stack-relative write access, the data is written to stack cache 226 twice: when the access is performed by load/store unit 222 and when the line containing the access is retired by reorder buffer 216. However, the correct data is stored in stack cache 226.

Finally, stack cache control unit 302 examines the tail pointer between consecutive clock cycles. When the tail pointer changes to a new value, reorder buffer 216 has retired a line of instructions. Stack cache control unit 302 detects the change and clears the associated read and write dependency bits throughout dependency bits storage 301. In this manner, the dependency bits associated with a reorder buffer line are cleared before the reorder buffer line is reallocated to new instructions, and so the dependency bits will accurately reflect dependency information collected with respect to the new instructions.

As can be seen from the foregoing description, stack cache 226 detects dependencies between stack-relative and non-stack-relative memory accesses and generates the appropriate corrective action. Advantageously, the above structure enables stack-relative memory accesses to occur earlier in the instruction processing pipeline than non-stack-relative memory accesses while still maintaining correct operation of a program. Performance of a superscalar microprocessor may be enhanced by including a stack cache similar to stack cache 226 and its associated dependency checking logic.

Figure 4A:
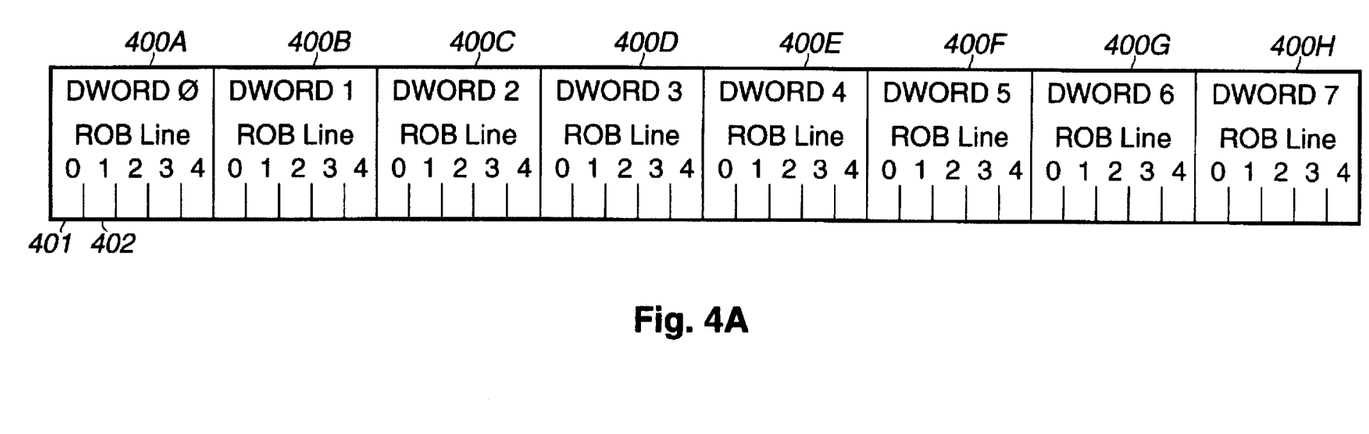
FIG. 4A is a diagram showing the dependency bits stored in the dependency bits storage depicted in FIG. 3 according to one embodiment of the present invention.

Turning now to FIG. 4A, one embodiment of the dependency bits stored with respect to a stack cache line is shown. In this embodiment, a read bit and a write bit is stored for each doubleword in the stack cache line and for each reorder buffer line. Therefore, the storage location storing the dependency bits is logically divided into eight regions 400A–400H. Each region stores the dependency bits associated with one doubleword. Region 400A stores the dependency bits associated with the first doubleword in the stack cache line. Similarly, region 400B stores the dependency bits associated with the second doubleword in the stack cache line, etc. In the embodiment described here, reorder buffer 216 includes 5 lines of instructions and so each region includes 10 bits, a read and a write bit for each of the five lines. Therefore, each region is logically divided into read and write bits for reorder buffer line zero (shown as reference number 401 for doubleword zero), read and write bits for reorder buffer line one (shown as reference number 402 for doubleword zero), etc.

Figure 4B:
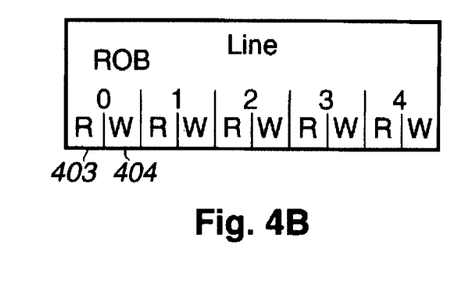
FIG. 4B is a diagram showing the dependency bits stored in the dependency bits storage depicted in FIG. 3 according to another embodiment of the present invention.

A second embodiment of the dependency bits is shown as FIG. 4B. In this embodiment, read and write bits are stored for each reorder buffer line (such as read bit 403 and write bit 404 associated with reorder buffer line 0). However, read and write bits are not stored for each doubleword in this embodiment. Therefore, the granularity of dependency checking is less fine in this embodiment then in the embodiment of FIG. 4A. Additionally, this embodiment utilizes less storage space than the embodiment shown in FIG. 4B. It is noted that many levels of granularity may be implemented with respect to the dependency checking bits stored in stack cache 226. Additionally, the read and write bits in FIGS. 4A and 4B are exemplary organizations. The bits may actually be organized in many different ways, and these ways are contemplated.

Figure 5:
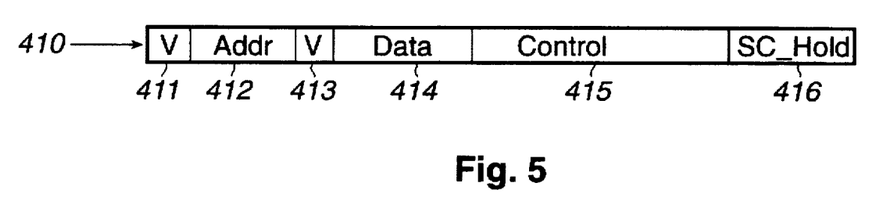
FIG. 5 is a diagram of a storage location within the load/store unit shown in FIG. 2 according to the present invention.

Turning next to FIG. 5, an exemplary storage entry 410 from a load/store buffer within load/store unit 222 is shown. Storage entry 410 stores a load or store memory access. A load access is a read access as referred to above, and a store access is a write access as referred to above. Storage entry 410 includes many fields, including an address valid field 411, an address field 412, a data valid field 413, a data field 414, a control field 415, and an sc-hold field 416. Address valid field 411 stores a value indicative of the validity of the value in address field 412. Address field 412 stores the address that the load or store is intended to access. Similar to address valid field 411, data valid field 413 stores a value indicative of the validity of the value stored in data field 414. Data field 414 stores data associated with store accesses prior to the data being stored into data cache 224 and/or stack cache 226. Control field 415 stores control information related to the load or store access. Exemplary information includes the type of access (load or store), whether or not storage entry 410 is storing a valid entry, the size of the operation, etc. Part of control field 415 is sc-hold field 416. Sc-hold field 416 stores a bit indicative when set of a load access which is found to be dependent upon a stack-relative write access. The bit is set when the load access is performed to stack cache 226 and the reply received on reply bus 254 indicates that the load access is dependent upon the stack-relative write access. Load/store unit 222 is configured to stall the load access until a signal received from reorder buffer 216 on LSRB handshake bus 262 indicates to retry load accesses. Load/store unit 222 resets sc-hold field 416 when the reorder buffer asserts the signal, and the load access is again eligible for presentation to data cache 224 and stack cache 226.

Figure 6:
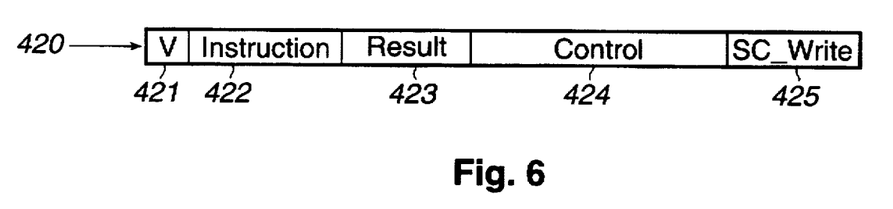
FIG. 6 is a diagram of a storage location within the reorder buffer shown in FIG. 2 according to the present invention.

Turning now to FIG. 6, an exemplary storage location 420 within reorder buffer 216 is shown. In one embodiment, six storage locations similar to storage location 420 comprise a line within reorder buffer 216. Each storage location 420 may store one instruction, and so six instructions may be store in each reorder buffer line. Storage location 420 includes a valid bit 421, an instruction field 422, a result field 423, a control field 424, and an sc-write bit 425. Valid bit 421 is indicative when set that a valid instruction is stored in storage location 420. Instruction field 422 stores information indicative of the type of instruction being executed, and includes an address field for storing the address generated by an instruction including a stack-relative write access. Result field 423 stores the result of executing the instruction prior to writing the result into register file 218 or stack cache 226. Control field 424 stores various control information including sc-write bit 425. Sc-write bit 425 is indicative, when set, that a stack-relative write access is stored in storage location 420. Reorder buffer 216 is configured to scan the storage locations 420 which form a reorder buffer line prior to retiring the line. The last write access to each address which has sc-write bit 425 set is conveyed upon retire bus 258 to stack cache 226. Stack cache 226 stores the data from result field 423 into the line containing the address stored in instruction field 422.

It is noted that the replacement algorithm used by stack cache control unit 302 includes an examination of the outstanding dependency bits associated with a line that might be replaced. In one embodiment, stack cache control unit 302 does not replace a stack cache line that has dependency bits set. In this way, a stack cache line that is accessed by a stack-relative write access is stored within stack cache 226 when the stack-relative write access is retired. Additionally, if the stack cache line were removed from stack cache 226 before all dependency bits were cleared, then dependency checking with respect to that line would be lost. Incorrect program execution would result.

It is additionally noted that in one embodiment stack cache 226 and data cache 224 store linear addresses. Therefore, it is possible that dependencies which exist between different linear addresses which translate to the same physical addresses would not be noted by the present dependency checking structure. Details regarding the translation structure of the x86 architecture may be found within the publication: "Programming the 80386" by Crawford, et al., Sybex, Inc., San Francisco, 1987. This publication is incorporated herein by reference in its entirety. However, an external aliasing control structure (not shown) is configured to allow data cache 224 to store at most one linear address which translates to a particular physical address. Since stack cache 226 may store data with respect to a different linear address than the same data being stored by data cache 224, a dependency may be undetected until a load miss from data cache 224 is serviced. When the external aliasing control structure receives a request for a linear address, the external aliasing control structure detects that a second linear address which translates to the same physical address as the requested linear address is stored within microprocessor 200. The external aliasing control structure communicates this fact to data cache 224 and stack cache 226. The aliased linear address is remapped to the new linear address and dependency checking is then performed.

It is noted that other aspects regarding the implementation of linear addressed caches such as instruction cache 204, data cache 224, and stack cache 226 may be found within the commonly assigned, co-pending patent application entitled: "Linearly Addressable Microprocessor Cache", Ser. No. 08/146,381, filed Oct. 29, 1993 now Ser. No. 08/780,263, by Witt. The disclosure of this patent application is incorporated herein by reference in its entirety.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by now Ser. No. 08/744,707, Pflum et al. The disclosure of this patent application is incorporated herein by reference in its entirety.

It is further noted that aspects regarding array circuitry may be found in the commonly assigned patent entitled "High Performance Ram Array Circuit Employing Self-Time Clock Generator for Enabling Array Access", U.S. Pat. No. 5,619,464, by Tran. The disclosure of this patent is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. NO. 08/377,843, filed Jan. 25, 1995, now Ser. No. 08/884,818 by Witt, et al. The disclosure of this patent application is incorporated herein by reference in its entirety.

It is still further noted that additional information regarding stack caches may be found in the co-pending, commonly assigned patent applications entitled: "A Method for Transferring Data Between a Pair of Caches Configured to be Accessed from Different Stages of an Instruction Processing Pipeline", Ser. No. 08/561,073 filed Nov. 20, 1995, by Tran, et al; "A Microprocessor Configured to Swap Operands in Order to Minimize Dependency Checking Logic", Ser. No. 08/561,030 filed Nov. 20, 1995, by Tran; and "A Reorder Buffer Capable of Detect Dependencies Between Accesses to a Pair of Caches", Ser. No. 08/561,075 filed Nov. 20, 1995, by Tran. The aforementioned patent applications are filed concurrently herewith and are incorporated herein by reference in their entirety.

An exemplary listing of fast path instructions for embodiments of microprocessor 200 employing the x86 microprocessor architecture is given as table 3 below:

TABLE 3

Fast Path Listing

| x86 Assembly | Fast Path/MROM |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |

TABLE 3-continued

Fast Path Listing

| x86 Assembly | Fast Path/MROM |
| --- | --- |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | fast path |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | fast path |
| JECXZ | fast path |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | fast path |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | fast path |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | fast path |
| NEG | fast path |
| NOP | not sent to functional unit |
| NOT | fast path |
| OR | fast path |
| OUT | MROM |
| OUTS | MROM |
| OUTSB | MROM |
| OUTSW | MROM |
| OUTSD | MROM |
| POP | fast path |

TABLE 3-continued

Fast Path Listing

| x86 Assembly | Fast Path/MROM |
|---|---|
| POPA | MROM |
| POPAD | MROM |
| POPF | MROM |
| POPFD | MROM |
| PUSH | fast path |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | fast path |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

In accordance with the above disclosure a dependency checking structure for stack-relative and non-stack-relative addresses is described. The dependency checking structure advantageously enables stack-relative memory accesses to be performed earlier in the instruction processing pipeline than was previously achievable. Performance of the superscalar microprocessor may be advantageously increased due to the faster access to operands, while correct operation of the program is maintained.

Numerous variations and modifications will become apparent to those skilled in the art once the above disclosure is fully appreciated. It is intended that the following claims be interpreted to embrace all such variations and modifications.

What is claimed is:

1. A dependency checking structure comprising a cache including:
   a first input bus configured to convey a first plurality of memory accesses;
   a second input bus configured to convey at least one memory access;
   a dependency data storage including a plurality of storage locations coupled to said first and second input buses wherein each of said plurality of storage locations is configured to store a plurality of dependency data, and wherein each of said plurality of dependency data is indicative of a memory access to an associated cache line by an instruction; and
   a control unit configured to receive said plurality of dependency data stored in one of said plurality of storage locations wherein said one of said plurality of storage locations is selected by said memory access conveyed upon said second input bus, and wherein said control unit is further configured to produce a signal on an output bus indicative of a dependency between said memory access and a prior memory access performed during a prior clock cycle.

2. The dependency checking structure as recited in claim 1 further comprising a load/store unit coupled to said second input bus and to said output bus wherein said load/store unit is configured to convey read and write memory accesses upon said second input bus.

3. The dependency checking structure as recited in claim 2 wherein said load/store unit is configured to stall a read memory request if said control unit indicates said dependency between said read memory access and said prior memory access.

4. The dependency checking structure as recited in claim 3 wherein said prior memory access is another write memory access.

5. The dependency checking structure as recited in claim 3 wherein said stall occurs by storing an indication of said dependency with said read memory access.

6. The dependency checking structure as recited in claim 3 further comprising a reorder buffer coupled to said output bus wherein said reorder buffer is configured to flush a particular instruction which generates said prior memory access when said control unit indicates said dependency between said prior memory access and said write memory access.

7. The dependency checking structure as recited in claim 6 wherein said prior memory access is another read memory access.

8. The dependency checking structure as recited in claim 6 wherein said reorder buffer is configured to flush instructions subsequent to said particular instruction in program order.

9. The dependency checking structure as recited in claim 6 wherein said reorder buffer is further configured to store an indication of said dependency with said write memory access if said write memory access is subsequent to said prior memory access in program order.

10. The dependency checking structure as recited in claim 9 wherein said prior memory access is another write memory access.

11. The dependency checking structure as recited in claim 2 further comprising a second cache coupled to said load/store unit wherein said load/store unit is configured to access said cache and said second cache with a particular memory access during a clock cycle.

12. The dependency checking structure as recited in claim 1 wherein said plurality of dependency checking data comprises a plurality of read dependency bits indicative of a read memory access and a plurality of write dependency bits indicative of a write memory access.

13. The dependency checking structure as recited in claim 12 wherein each of said plurality of read dependency bits is indicative of a read memory access to said associated cache line.

14. The dependency checking structure as recited in claim 13 wherein said each of said plurality of read dependency bits is further indicative of said read memory access to a particular double word within said associated cache line.

15. The dependency checking structure as recited in claim 12 wherein each of said plurality of write dependency bits is indicative of a write memory access to said associated cache line.

16. The dependency checking structure as recited in claim 15 wherein said each of said plurality of write dependency bits is further indicative of said write memory access to a particular double word within said associated cache line.

17. The dependency checking structure as recited in claim 1 wherein said cache further includes a second plurality of storage locations configured to store data bytes, wherein each one of said second plurality of storage locations is associated with a respective one of said plurality of storage locations.

18. The dependency checking structure as recited in claim 1 wherein said control unit is configured to set particular bits within said plurality of dependency data according to said first plurality of memory accesses.

19. The dependency checking structure as recited in claim 18 further comprising a plurality of decode units, wherein each of said plurality of decode units is coupled to one of said plurality of first input buses.

20. The dependency checking structure as recited in claim 19 wherein said plurality of decode units are configured to convey said first plurality of memory accesses upon decoding a plurality of instructions.

21. The dependency checking structure as recited in claim 20 wherein said first plurality of memory accesses comprise stack-relative memory accesses.

22. A method of detecting dependencies between a memory access to a first cache performed within a first pipeline stage and a second memory access to a second cache performed within a second pipeline stage comprising:

recording read and write memory accesses to one of a plurality of storage locations within said first cache; and checking for a prior memory access to one of said plurality of storage locations within said first cache when said second memory access is performed to a datum stored within said one of said plurality of storage locations.

23. The method as recited in claim 22 further comprising flushing the pipeline when said second memory access is a write memory access and said prior memory access is a read memory access dependent upon said write memory access as indicated by said recording.

24. The method as recited in claim 22 further comprising stalling said second memory access when said second memory access is a read memory access and is dependent upon said prior memory access as indicated by said recording.

25. The method as recited in claim 24 wherein said stalling occurs until said prior memory access is performed.

26. The method as recited in claim 24 wherein said prior access is a write memory access.

27. The method as recited in claim 22 wherein said recording is performed by setting one of a plurality of dependency bits stored within said first cache.

28. The method as recited in claim 27 wherein said plurality of dependency bits comprises a plurality of read dependency bits indicative of a read memory access and a plurality of write dependency bits indicative of a write memory access.

* * * * *